United States Patent [19]
Valsecchi

[11] Patent Number: 5,609,444
[45] Date of Patent: Mar. 11, 1997

[54] DRILLING DEVICE WITH AN EXTENSION ARM

[75] Inventor: Giovanni Valsecchi, Civate, Italy

[73] Assignee: Black & Decker Inc., Newark, Del.

[21] Appl. No.: 575,444

[22] Filed: Dec. 20, 1995

Related U.S. Application Data

[63] Continuation of Ser. No. 382,413, Feb. 3, 1995, abandoned.

[30] Foreign Application Priority Data

Feb. 4, 1994 [GB] United Kingdom ............... 9402121

[51] Int. Cl.⁶ ...................................... B23B 49/00
[52] U.S. Cl. .................... 408/79; 408/110; 408/115 R
[58] Field of Search ................... 408/52, 53, 79, 408/88, 97, 110, 112, 115 R, 234 R

[56] References Cited

U.S. PATENT DOCUMENTS

| | | | |
|---|---|---|---|
| 3,775,857 | 12/1973 | Handy | 408/115 R |
| 5,230,592 | 7/1993 | Degen et al. | 408/115 R |

FOREIGN PATENT DOCUMENTS

| | | | |
|---|---|---|---|
| 50210 | 4/1982 | European Pat. Off. | 408/115 R |
| 136080 | 4/1985 | European Pat. Off. | |
| 430228 | 6/1991 | European Pat. Off. | |
| 445363 | 9/1991 | European Pat. Off. | |
| 2750806 | 5/1979 | Germany . | |
| 3302164 | 7/1984 | Germany | 408/110 |
| 619636 | 10/1980 | Switzerland . | |
| 880472 | 10/1961 | United Kingdom . | |

*Primary Examiner*—Daniel W. Howell
*Attorney, Agent, or Firm*—Dennis A. Dearing; John D. Del Ponti; Charles E. Yocum

[57] ABSTRACT

An extension arm 23 for a multiple hole drilling device 1, the drilling device 1 comprising a frame 17 having a first surface 19 for abutting a workpiece and drive means 3,9,11 for plunging a row of rotating drill bits 7,13 through the first surface 19 into the workpiece, the extension arm 23 comprising a body 25, adapted for attachment to the frame 17 of the drilling device 1, defining a slit 27 colinear with the row of drill bits 7,13, and a protrusion 33,31,35 accommodated within the slit 27 for engaging a drill hole formed in a workpiece, wherein the protrusion 33,31,35 is lockable to the body 25 of the extension arm 23 such that additional drill holes can be formed in the workpiece at repeatable distances along the workpiece. By enabling controlled positioning of groups of drill holes to be achieved, dowel joints requiring corresponding drill holes in two workpieces can be simply, easily and accurately produced.

14 Claims, 2 Drawing Sheets

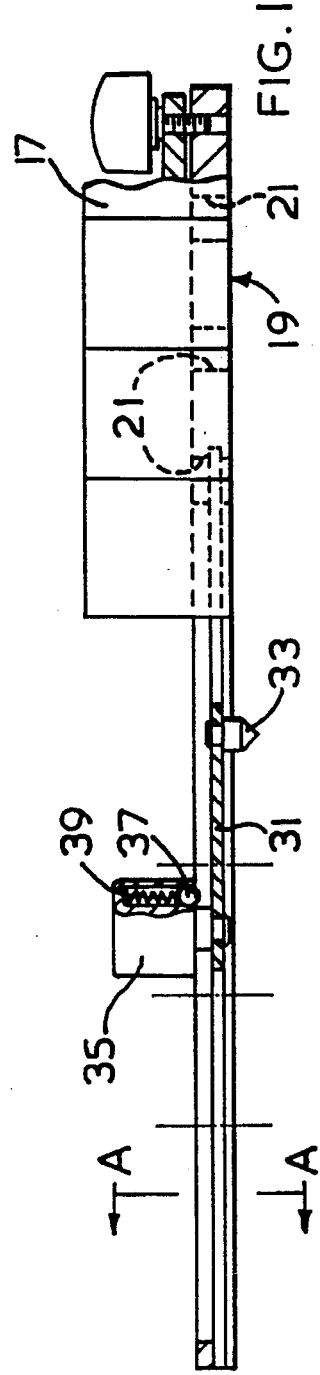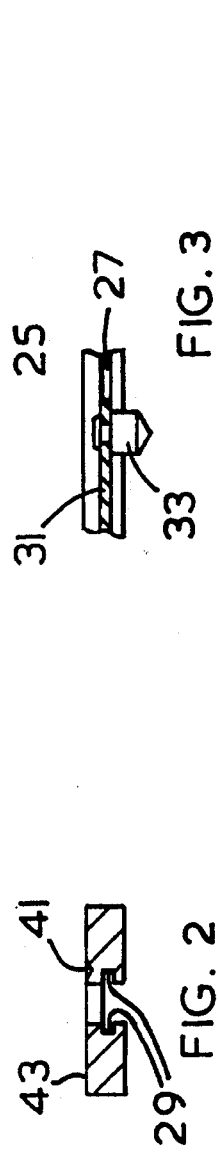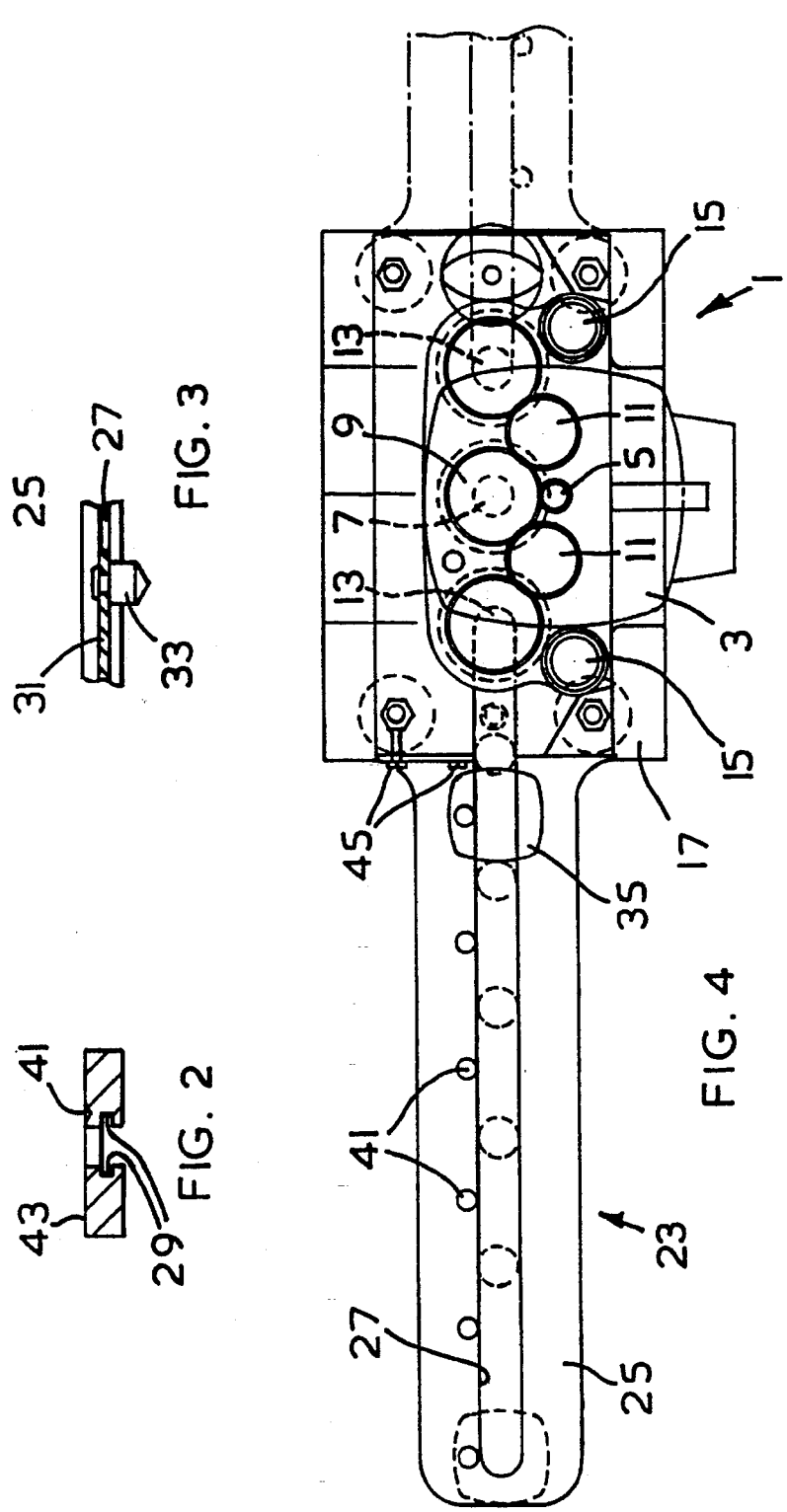

DRILLING DEVICE WITH AN EXTENSION ARM

This application is a continuation of continuation application Ser. No. 08/382,413, filed Feb. 3, 1995 now abandoned.

This invention relates to multiple hole drilling devices, and in particular to an extension arm for such a drilling device.

A hand-held multiple hole drilling device which is capable of producing accurately positioned drill holes in a workpiece so that dowel joints can be easily and accurately produced between two pieces of wood or other material is described in our co-pending U.K. patent application No 9402120.1.

Briefly, this multiple hole drilling device comprises a frame having a first surface for abutting a workpiece and drive means for plunging a row of rotating drill bits through the first surface into the workpiece to produce a row of drill holes in the workpiece. A bearing surface, substantially perpendicular to the first surface of the device, can be provided to dictate the distance of the row of holes from an edge of the workpiece. Hence, it is a simple matter to produce a large number of drill holes in a workpiece which are all equally distant from one edge of the workpiece. However, it is not so easy to ensure that the spacing between adjacent groups of drill holes, each group being produced during a single plunging of the drive means, is always the same or is accurately known. Hence, the present invention aims to provide an apparatus which enables accurate drill hole positioning to be achieved.

In accordance with the present invention, there is provided a multiple hole drilling device comprising a frame having a first surface for abutting a workpiece and drive means to plunge a row of rotating drill bits through the first surface into the workpiece, and an extension arm comprising a body, adapted for attachment to the frame of the drilling device, defining a slit colinear with the row of drill bits, and a protrusion for engaging a drill hole formed in a workpiece, wherein the protrusion is lockable to the body of the extension arm such that additional drill holes can be formed in the workpiece at repeatable distances along the workpiece. As a result, not only can regularly spaced drill holes be produced in a single workpiece, but also correspondingly spaced drill holes can be formed in a second workpiece which is to be dowel jointed to the first workpiece. Thus, neat and accurate dowel joints can be easily produced.

In one preferred embodiment, the extension arm is fixed to the frame, the protrusion being accommodated in the slit and being adjustable along said slit to different positions with respect to the frame.

In a second preferred embodiment, the frame further comprises a cross passage parallel said first surface and said row of drill bits, the extension arm being slidable in said passage, said bits being adapted to pass through said slit on plunging thereof.

The passage preferably extends completely through said frame so that the extension arm can extend from said frame in either direction. The protrusion in this event is preferably detachable from the body so that it can be removed when the extension arm is on one side of the frame and be replaced on the other side of the frame.

Alternatively, two fixed but retractable protrusions may be provided, one at each end of the extension arm, the arm being adjustable in the frame so that the protrusions are located at different positions with respect to the frame.

The or each protrusion can preferably be replaced by a protrusion having a different size, the size of the protrusion depending on the diameter of the drill hole in the workpiece to be engaged. Hence, the size of protrusion can be chosen to ensure that little or no play is allowed between the extension arm and a drill hole already formed in a workpiece, thereby avoiding any possibility of incorrect positioning.

The protrusion may be lockable to the body by means of a biased detent engaging a recess in the body. In a preferred embodiment, a biased ball engages a dimple in the body. The body may be lockable in the frame by similar means.

Preferably a plurality of equally spaced recesses or dimples are provided along the body. In a particular embodiment, the dimples are spaced approximately 32 mm from each other.

If a biased ball is used to lock the protrusion to the body, the ball is preferably biased by a spring and the ball and spring are mounted in a knob.

The protrusion preferably includes a knob extending above the body, a stud extending below the body for engaging a drill hole in a workpiece and a plate joining the knob to the stud.

The stud is preferably tapered at its end to facilitate entry into a drill hole.

The plate is preferably received for sliding motion along a groove formed in the body of the extension arm whereby the protrusion is positionable at different positions with respect to the frame. In such an arrangement, the plate preferably fills the groove to avoid any unwanted free play, thereby ensuring that accurate positioning of the drill bits can be achieved.

If a knob is incorporated, it is preferably rotatable relative to the plate to lock and unlock the protrusion.

Although a specific embodiment of the present invention is described herein, many alternative arrangements can of course be readily envisaged by a man skilled in the relevant art.

A specific embodiment of the present invention is now described, by way of example only, with reference to the accompanying drawings, in which:

FIG. 1 is a partially sectioned side view of an extension arm according to the present invention attached to a frame of a drilling device;

FIG. 2 is a cross-sectional view in the direction A—A of FIG. 1;

FIG. 3 is a sectional side view of the part of FIG. 1 including the stud of the protrusion, but wherein a larger diameter stud is shown;

FIG. 4 is a schematic plan view of an extension arm according to the present invention attached to a drilling device, but wherein the protrusion is positioned closer to the frame of the drilling device than that shown in FIG. 1.

Figure 5:
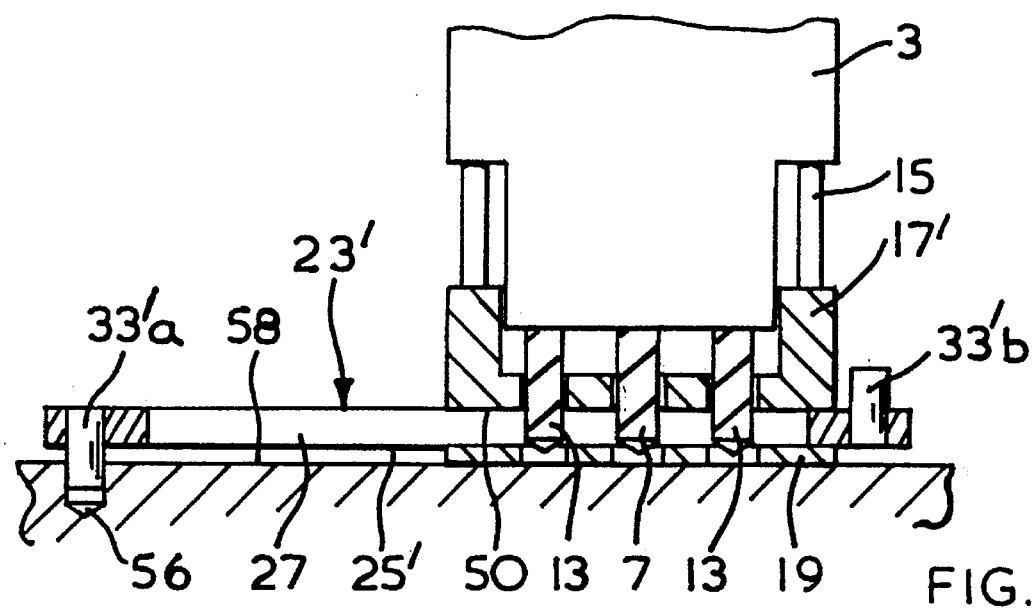
FIG. 5 is a side section through an alternative embodiment of the present invention.

With reference to the drawings, a multiple hole drilling device 1 (cf. FIG. 4) comprises a motor 3 rotating a spindle 5 for driving a drill bit 7 mounted on a chuck 9. A pair of gear wheels 11 engage with a mesh on the chuck 9 to transfer drive to outer drill bits 13. The motor 3, gears 11, chucks 9 and drill bits 7,13 are slidably mounted on rods 15 fixed to a support frame 17. The support frame 17 includes a first surface 19 for engaging a workpiece (not shown). The first surface 19 includes three apertures 21 through which the drill bits 7,13 are plunged into a workpiece as the motor is lowered down the rods 15. When plunging of the drills bits 7,13 has been completed, a row of three drill holes is formed in the workpiece. The drill bits 7,13 are then withdrawn from the drill holes prior to producing an additional set of three drill holes elsewhere on the workpiece.

By plunging the drill bits 7,13 through the first surface 19 of the frame 17, the drill holes are formed substantially perpendicular to the surface of the workpiece. The exact positions of the drill holes relative to an edge of the workpiece may be dictated by means of a bearing surface (not shown) attached to the frame 17 extending substantially perpendicularly to the first surface 19. Thus, a series of groups of drill holes can be easily formed in a row along a workpiece.

To enable accurate positioning of each group of three drill holes relative to each other along the workpiece, an extension arm 23 according to the present invention is provided. The extension arm 23 comprises a body 25 defining a slit 27 along its length. Two parallel grooves 29 are formed on the inside surface of the slit 27 along the length of the body 25. These grooves 29 accommodate a plate 31 with a close fit. At one end of the plate 31 a stud 33 extends downwardly below the bottom of the body 25 of the extension arm 23. The stud 33 has a tapered end to facilitate entry of the stud into a drill hole formed in workpiece. The stud 33 is sized to be received with a close fit in the drill hole and, if necessary, can be readily changed for the correct size of stud.

At the other end of the plate 31 is mounted a knob 35 carrying a ball 37 biased by means of a spring 39. The ball 37 engages a dimple 41 (cf. FIG. 2) formed in an upper surface 43 of the body 25.

The knob 35, the plate 31 and the stud 33 are free to slide along the slit 27 of the extension arm 23 snapping the ball 37 out of engagement with one dimple and until the ball 37 snaps into the next dimple 41. Hence, when a set of three drill holes have been produced in a workpiece, the position of the next group of three (or more, or less) drill holes can be accurately determined by moving the protrusion, comprising the stud 33, the plate 31 and the knob 35, along the slit 27 of the extension arm 23 until the knob 35 engages the ball 37 with a dimple 41 in the desired position. In this regard, as can be seen from FIG. 4, six dimples 41 are shown in the drawing. If the dimple 41 closest to the support frame 17 is engaged, the distance between adjacent groups of drill holes will be at a minimum, namely 32 mm. If, however, the ball 37 engages the dimple 41 furthest from the support frame 17, as shown in dashed line in FIG. 4, when the stud 33 has engaged in the end drill hole of the group already formed, the next closest drill hole produced when the drill bits 7,13 are again plunged into the workpiece will be five times 32 mm, namely 160 mm. In practice, however, it will not be possible to engage the ball 37 in the dimple 41 as shown in solid line in FIG. 4 because the stud 33 would then be directly below a drill bit 13. Hence, this would only be possible if that particular drill bit 13 had previously been removed.

By using an extension arm 23 according to the present invention, it is not only possible to produce a series of groups of drill holes in line along a workpiece, but also to ensure that corresponding drill holes on a second workpiece, which is to be dowel jointed to the first workpiece, can be accurately positioned. In this regard, it is simply necessary to remember which dimple 41 was engaged during the drilling of the first workpiece when preparing the second workpiece for drilling.

FIG. 4 of the accompanying drawings shows the extension arm 23 of this specific embodiment detachably but fixedly attached to the frame 17 by means of screws 45 engaging the side of the support frame 17.

Figure 6:
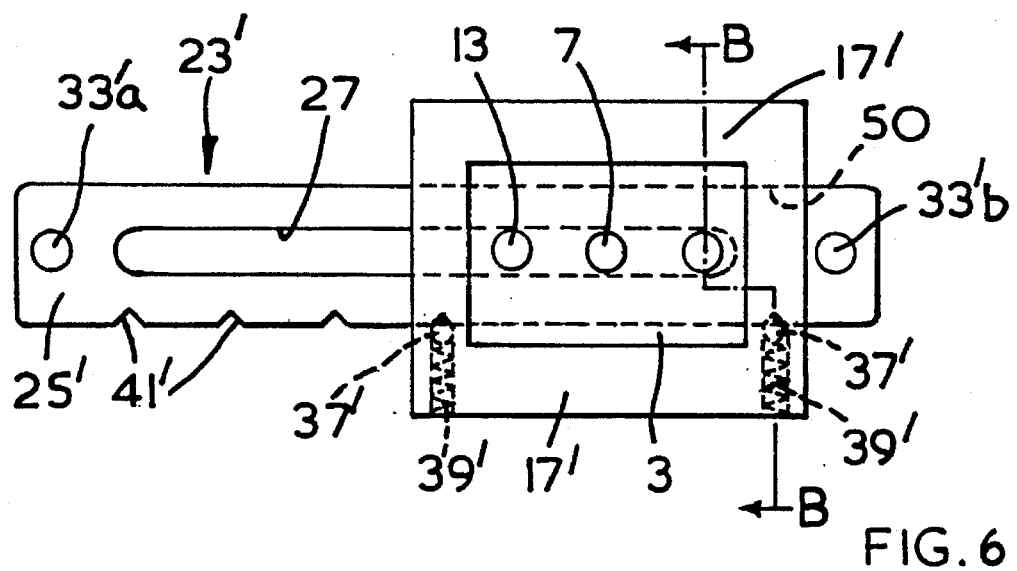
FIG. 6 is a schematic top view of the device of FIG. 5.
Figure 7:
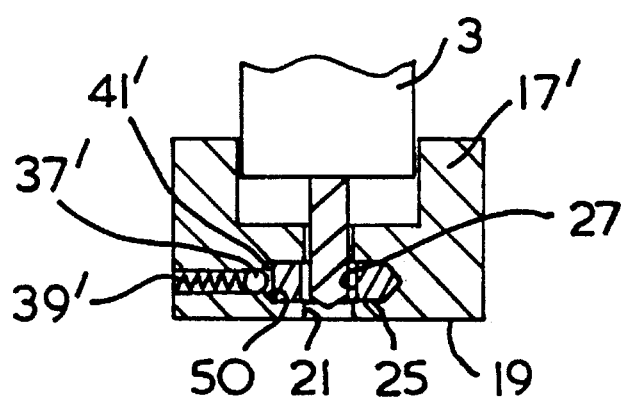
FIG. 7 is a section on the line B—B in FIG. 6.

FIGS. 5 to 7 show a preferred embodiment in which frame 17' further comprises a passage 50 through the frame, which passage lies parallel the surface 19 and the row of drill bits 7,13.

The passage 50 is shaped to receive the extension arm 23' in a sliding fit, the slit 27 being dimensioned to allow free passage therethrough of the drill bits 7,13.

In its edge 52, a series of dimples 41' are spaced and in the frame 17' are provided spring (39') loaded balls 37' adapted and spaced each to engage a respective dimple 41' and to locate the arm 23' in one of several possible positions. The arm is movable to snap the balls 37' out of engagement until they engage the next pair of dimples.

While the protrusion arrangement of the first embodiment, or one similar thereto, is quite feasible in the present example, the one proviso being the necessity to enable convenient detachment of the protrusion from the arm on one side of the frame for attachment on the other side (as circumstances require), the embodiment of FIGS. 5 to 7 shows two protrusions 33'a and b, fixed one at either end of the arm 23'.

Protrusion 33'a is shown in an operational position in which it engages previously drilled hole 56 in a workpiece 58. Protrusion 33'b is shown in a retracted position where it does not interfere with the workpiece 58. Thus the next row of holes to be drilled by bits 7,13 are accurately located with respect to hole 56. The distance of bits 7,13 from hole 56 is adjusted by adjustment of arm 23' in the passage 50.

Passage 50 could equally be a channel in the base surface 19 so that the extension bar 23' can lie flush with the workpiece 58.

It will of course be understood that the present invention has been described above purely by way of example, and that modifications of detail can be made within the scope of the invention.

I claim:

1. A multiple hole drilling device comprising a frame having a first surface for abutting a workpiece and drive means to plunge a row of rotating drill bits through the first surface into the workpiece, and an extension arm comprising a body, adapted for attachment to the frame of the drilling device, defining a slit colinear with the row of drill bits, and a protrusion for engaging a drill hole formed in a workpiece, wherein the protrusion is lockable to the body of the extension arm such that additional drill holes can be formed in the workpiece at repeatable distances along the workpiece.

2. A device as claimed in claim 1, wherein the protrusion can be replaced by a protrusion having a different size, the size of the protrusion depending upon the diameter of the drill hole in the workpiece to be engaged.

3. A device as claimed in claim 1, wherein the protrusion is lockable to the body by means of a detent biased into engagement with a recess in the body.

4. A device as claimed in claim 3, wherein the protrusion is lockable to the body by means of a biased ball engaging a dimple in the body.

5. A device as claimed in claim 4, wherein a plurality of equally spaced dimples are provided along the body.

6. A device as claimed in claim 5, wherein the dimples are spaced apart by approximately 32 mm.

7. A device as claimed in claim 4, wherein the ball is biased by a spring, the ball and spring being mounted in a knob.

8. A device as claimed in claim 1, wherein the protrusion includes a knob extending above the body, a stud extending below the body for engaging a drill hole in a workpiece and a plate joining the knob to the stud.

9. A device as claimed in claim 8, wherein the stud includes a tapered region to facilitate entry into a drill hole.

10. A device as claimed in claim 8, wherein the plate is received for sliding motion along a groove formed in the body of the extension arm.

11. A device as claimed in claim 1, in which the extension arm is fixed to the frame.

12. A device as claimed in claim 1, in which the frame further comprises a cross passage parallel said first surface and said row of drill bits, the extension arm being slidable in said passage, said bits adapted to pass through said slit on plunging thereof.

13. A device as claimed in claim 12, in which said passage extends completely through said frame so that the extension arm can extend from said frame in either direction.

14. A device as claimed in claim 13, in which two fixed but retractable protrusions are provided, one at each end of the extension arm, the arm being adjustable in the frame so that the protrusions are located at different positions with respect to the frame.

* * * * *